United States Patent
Canberk et al.

(10) Patent No.: US 11,803,234 B2
(45) Date of Patent: *Oct. 31, 2023

(54) AUGMENTED REALITY WITH EYEWEAR TRIGGERED IOT

(71) Applicant: Snap Inc., Santa Monica, CA (US)

(72) Inventors: Ilteris Canberk, Marina Del Rey, CA (US); Shin Hwun Kang, Playa Del Rey, CA (US); Doug Mead, Oakland, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,491

(22) Filed: Nov. 16, 2022

(65) Prior Publication Data

US 2023/0076353 A1 Mar. 9, 2023

Related U.S. Application Data

(63) Continuation of application No. 16/836,431, filed on Mar. 31, 2020, now Pat. No. 11,531,390.

(51) Int. Cl.
| | |
|---|---|
| *G06F 3/01* | (2006.01) |
| *H04B 1/3827* | (2015.01) |
| *H04W 4/029* | (2018.01) |
| *G06T 7/73* | (2017.01) |
| *G06F 18/22* | (2023.01) |

(52) U.S. Cl.
CPC .............. *G06F 3/012* (2013.01); *G06F 18/22* (2023.01); *G06T 7/74* (2017.01); *H04B 1/385* (2013.01); *H04W 4/029* (2018.02); *H04B 2001/3866* (2013.01)

(58) Field of Classification Search
CPC . G06F 3/02; G06T 7/74; H04W 4/029; G06K 9/6201; H04B 1/385; H04B 2001/3866
See application file for complete search history.

(56) References Cited

U.S. PATENT DOCUMENTS

| 11,531,390 B1 * | 12/2022 | Canberk ............... H04W 4/029 |
| 2017/0351098 A1 | 12/2017 | Osterhout et al. |
| 2021/0183135 A1 | 6/2021 | Lin et al. |

* cited by examiner

*Primary Examiner* — Kenneth B Lee, Jr.
(74) *Attorney, Agent, or Firm* — Culhane Meadows PLLC; Stephen J. Weed

(57) ABSTRACT

Systems, devices, media, and methods are presented for an immersive augmented reality (AR) experience using an eyewear device. A portable eyewear device includes a processor, a memory, and a display projected onto at least one lens assembly. The memory has programming stored therein that, when executed by the processor, captures information depicting an environment surrounding the device and identifies a match between objects in that information and predetermined objects in previously obtained information for the same environment. When the position of the eyewear device reaches a preselected location with respect to the matched objects, a physical output is provided to produce the immersive experience. The physical output changes as the position of the eyewear device moves to maintain the immersive experience.

20 Claims, 16 Drawing Sheets

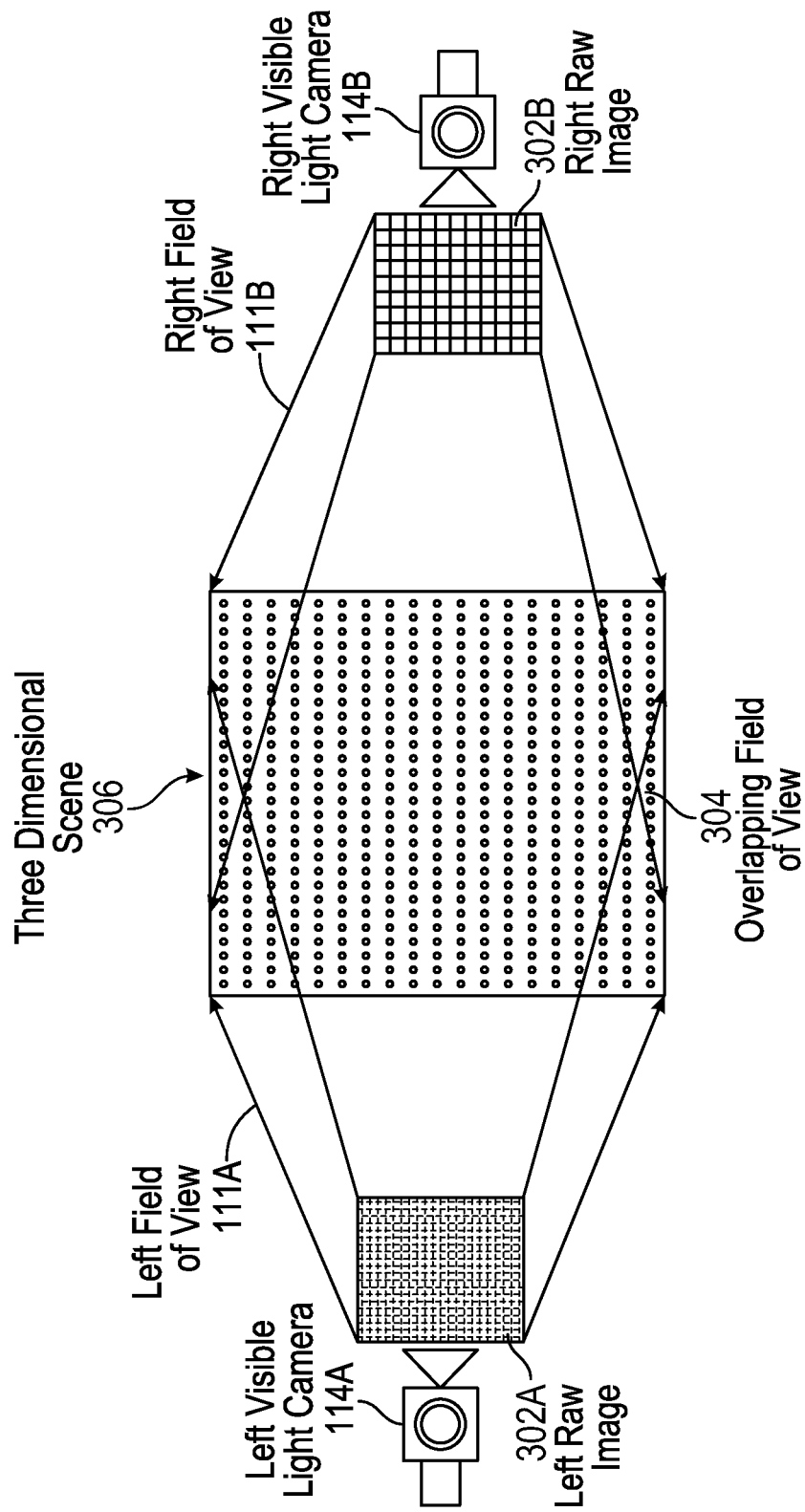

AUGMENTED REALITY WITH EYEWEAR TRIGGERED IOT

CROSS-REFERENCE TO RELATED APPLICATIONS

This application is a Continuation of U.S. application Ser. No. 16/836,431 filed on Mar. 31, 2020, the contents of which are incorporated fully herein by reference.

TECHNICAL FIELD

Examples set forth in the present disclosure relate to portable electronic devices, including wearable devices such as eyewear, that control Internet of Things (IoT) electronic devices to create an immersive augmented reality experience.

BACKGROUND

Many types of computers and electronic devices available today, such as mobile devices (e.g., smartphones, tablets, and laptops), handheld devices (e.g., smart rings, special-purpose accessories), and wearable devices (e.g., smart glasses, digital eyewear, headwear, headgear, and head-mounted displays), include a variety of sensors, wireless transceivers, input systems (e.g., touch-sensitive surfaces, pointers), peripheral devices, displays, and graphical user interfaces (GUIs) through which a user can interact with displayed content.

Internet of things (IoT) electronic devices have been gaining in popularity. The Internet of things (IoT) is a system of interrelated computing devices, mechanical and digital machines provided with unique identifiers capable of transferring data over a network.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more non-limiting examples. Included in the drawing are the following figures:

FIG. 3 is a diagrammatic depiction of a three-dimensional scene, a left raw image captured by a left visible-light camera, and a right raw image captured by a right visible-light camera;

DETAILED DESCRIPTION

Figure 1A:
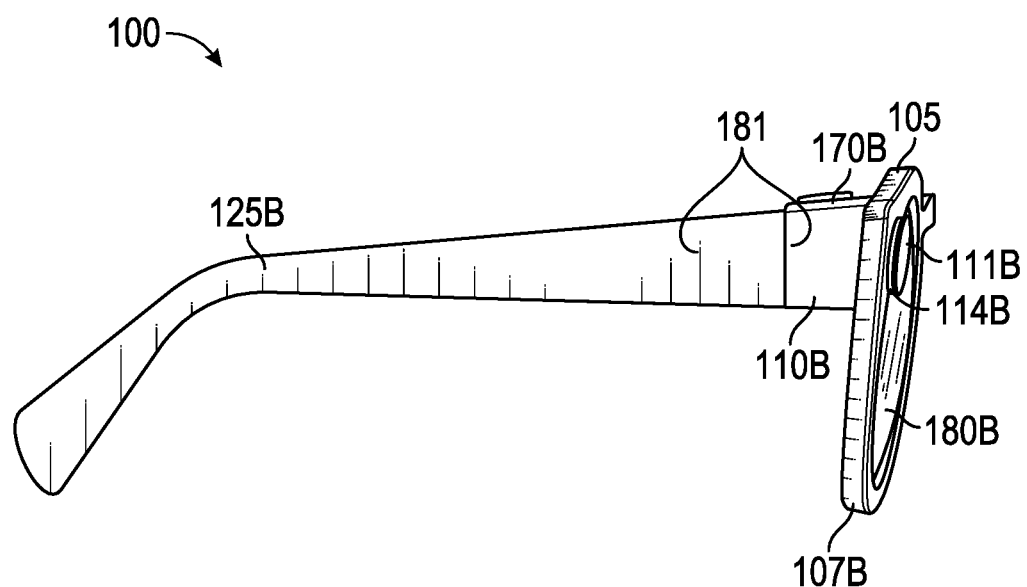
FIG. 1A is a side view (right) of an example hardware configuration of an eyewear device suitable for use in an augmented reality system.

Examples of a system for providing an immersive AR experience are disclosed. The system includes an eyewear device that has a processor, a memory, and an image sensor. The memory has programming that, when executed by the processor, captures image information for an environment surrounding the device, identifies a match between objects in the image information and predetermined objects in previously obtained information for the same environment. When the position of the eyewear device within the environment reaches a predefined location, the eyewear device establishes communication with a remote device that is capable of producing a physical output to deliver an augmented reality experience. Movement of the eyewear device controls the physical output. Example physical output includes interacting with a displayed scene, turning on an air flow device (e.g., a fan to give a puff of air that turns a page in a book), and emitting sound from a speaker. The eyewear device may additionally display augmented reality image overlays that coincide with the physical output to further enhance the augmented reality experience.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The term "coupled" or "connected" as used herein refers to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

The orientations of the eyewear device, the handheld device, associated components and any other complete devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible and may include a raised or otherwise tactile edge that provides feedback to the user about the location and boundary of the touchpad 181. In other examples, the eyewear 100 may include a touchpad on the left side.

The surface of the touchpad 181 is configured to detect finger touches, taps, and gestures (e.g., moving touches) for use with a GUI displayed by the eyewear, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
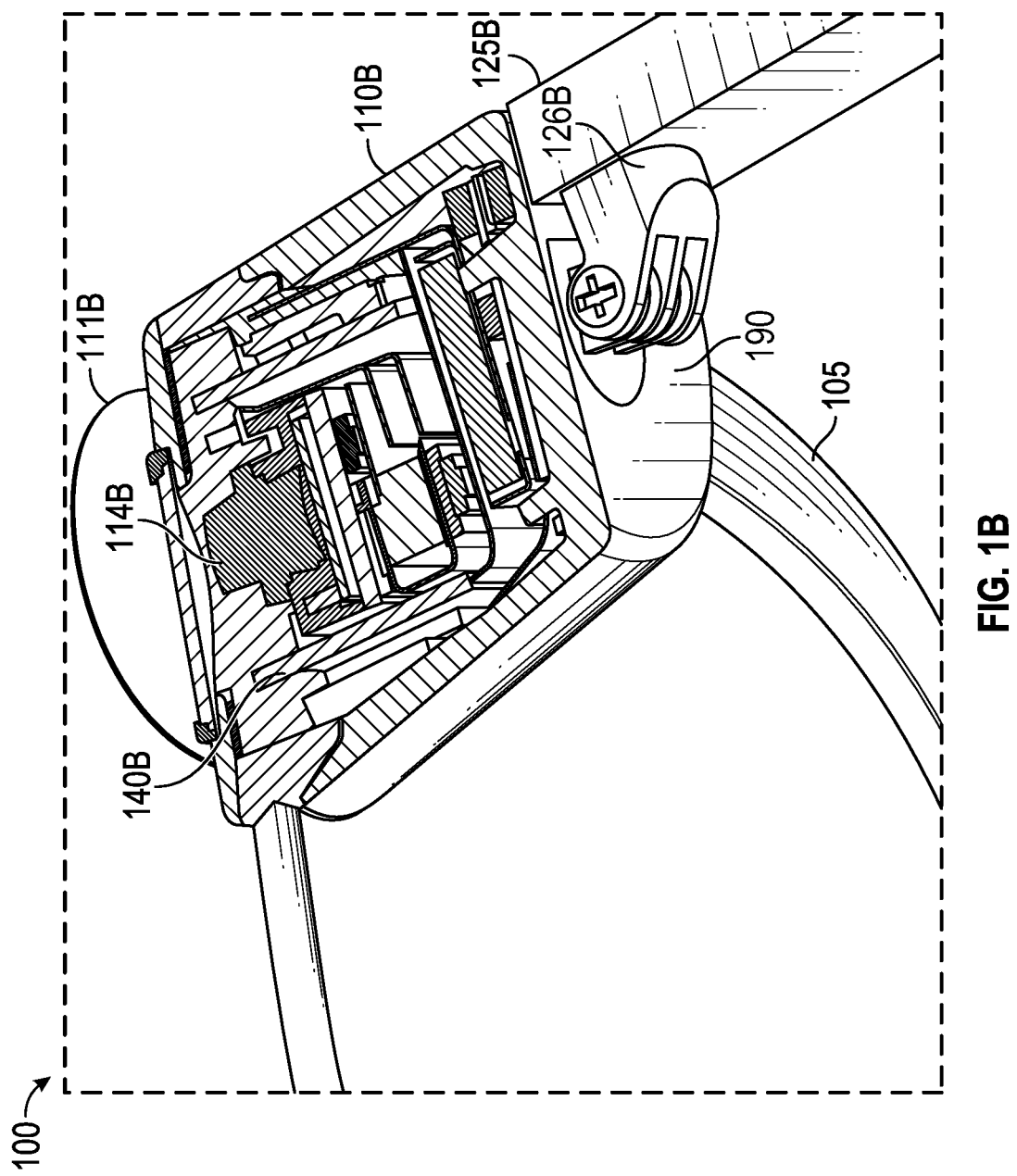
FIG. 1B is a top, partly sectional view of a right corner of the eyewear device of FIG. 1A depicting a right visible-light camera, and a circuit board.
Figure 1C:
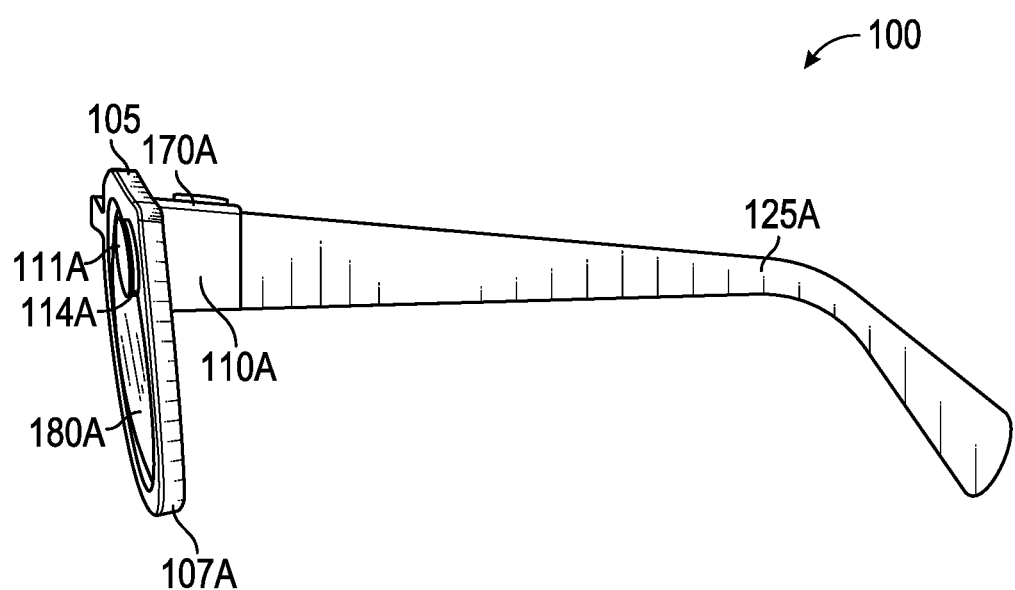
FIG. 1C is a side view (left) of an example hardware configuration of the eyewear device of FIG. 1A, which shows a left visible-light camera.
Figure 1D:
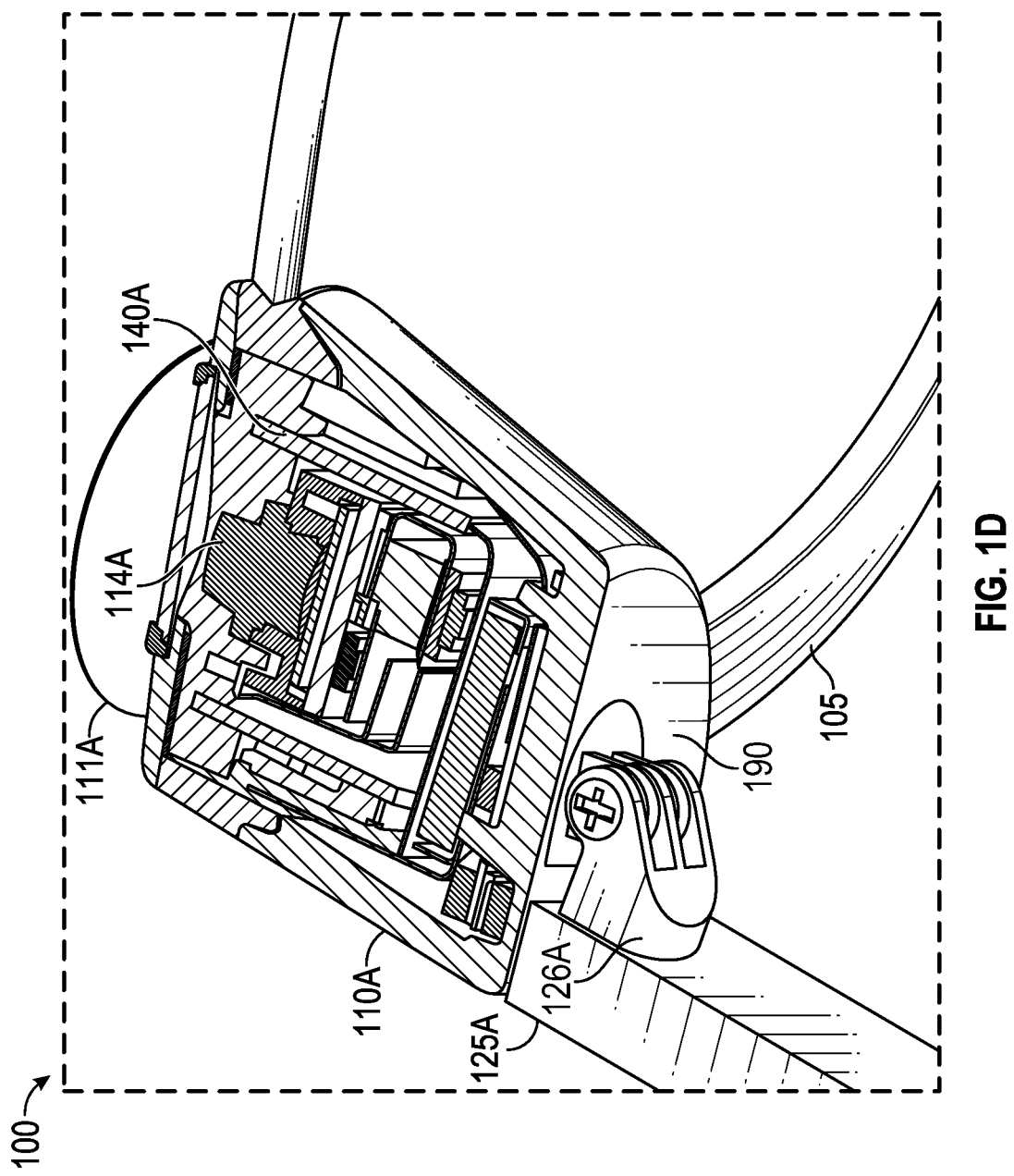
FIG. 1D is a top, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible-light cameras 114A, 114B have a field of view with an angle of view between 15° to 30°, for example 24°, and have a resolution of 480×480 pixels. The "angle of coverage" describes the angle range that a lens of visible-light cameras 114A, 114B or infrared camera 410 (see FIG. 4A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 640p (e.g., 640×480 pixels for a total of 0.3 megapixels), 720p, or 1080p. Other examples of visible-light cameras 114A, 114B that can capture high-definition (HD) still images and store them at a resolution of 1642 by 1642 pixels (or greater); or record high-definition video at a high frame rate (e.g., thirty to sixty frames per second or more) and store the recording at a resolution of 1216 by 1216 pixels (or greater).

The eyewear device 100 may capture image sensor data from the visible-light cameras 114A, 114B along with geo-location data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4A) may be coupled to the visible-light cameras 114A, 114B to receive and store the visual image information. The image processor 412 or another processor, which controls operation of the visible-light cameras 114A, 114B to act as a stereo camera simulating human binocular vision, may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or any combination thereof. The texture attribute quantifies the perceived texture of the depth image, such as the spatial arrangement of color or intensities in a region of vertices of the depth image.

In one example, the eyewear device 100 includes a frame 105, a left temple 110A extending from a left lateral side 170A of the frame 105, and a right temple 125B extending from a right lateral side 170B of the frame 105. The left camera 114A is connected to the frame 105, the left temple 125B, or the left corner 110A to capture a left raw image 302A from the left side of scene 306. The right camera 114B is connected to the frame 105, the right corner 110A, or the right temple 125B to capture a right raw image 302B from the right side of scene 306.

Figure 2A:
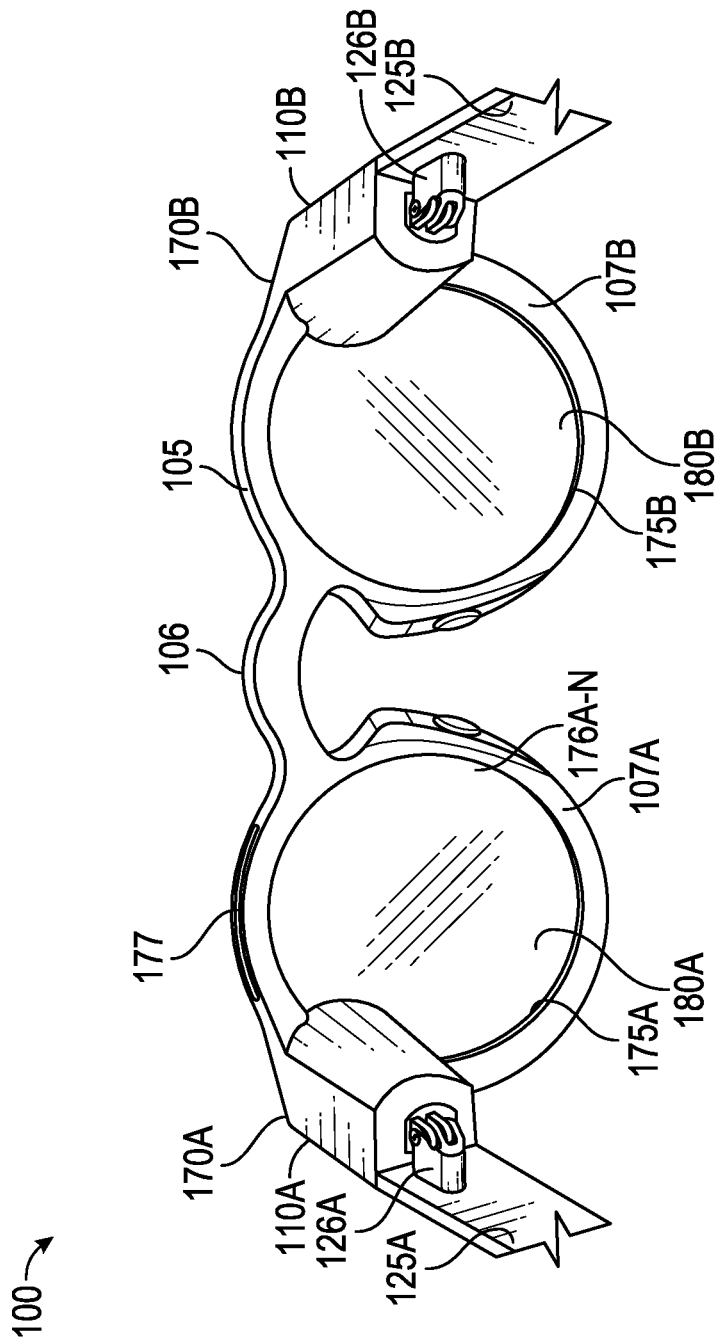
FIGS. 2A and 2B are rear views of example hardware configurations of an eyewear device utilized in an augmented reality system.
Figure 2B:
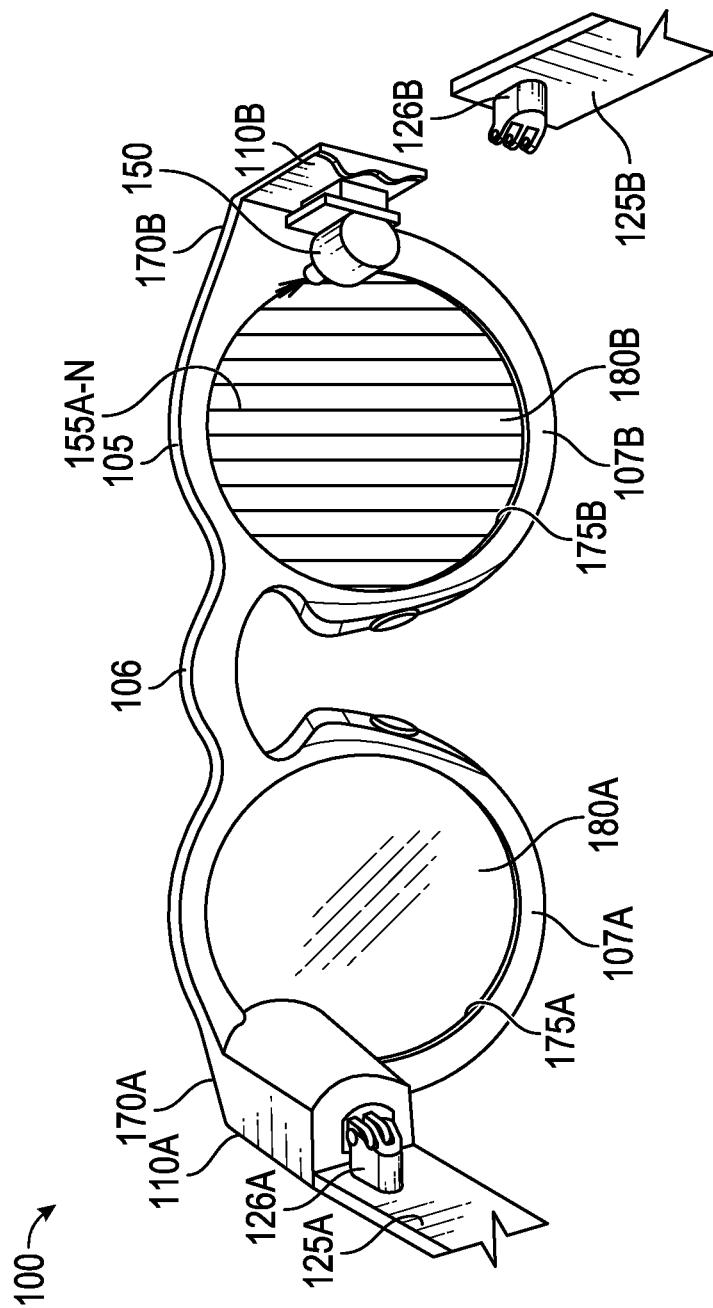

FIG. 1B is a top cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a top cross-sectional view of a left corner 110A of the eyewear device of FIG. 1C depicting the left visible-light camera 114A of the three-dimensional camera, and a circuit board. Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). The right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. As shown in FIG. 2B, the left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s), low-power wireless circuitry (e.g., for wireless short range network communication via Bluetooth™), high-speed wireless circuitry (e.g., for wireless local area network communication via WiFi).

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge/diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector (not shown) and a right projector 150). The left optical assembly 180A may include a left display matrix 177 or a left set of optical strips that are configured to interact with light from a left projector (not shown). Similarly, the right optical assembly 180B may include a right display matrix (not shown) or a right set of optical strips 155A, 155B, ... 155N that are configured to interact with light from the right projector 150. In this example, the eyewear device 100 includes a left display and a right display.

Figure 4A:
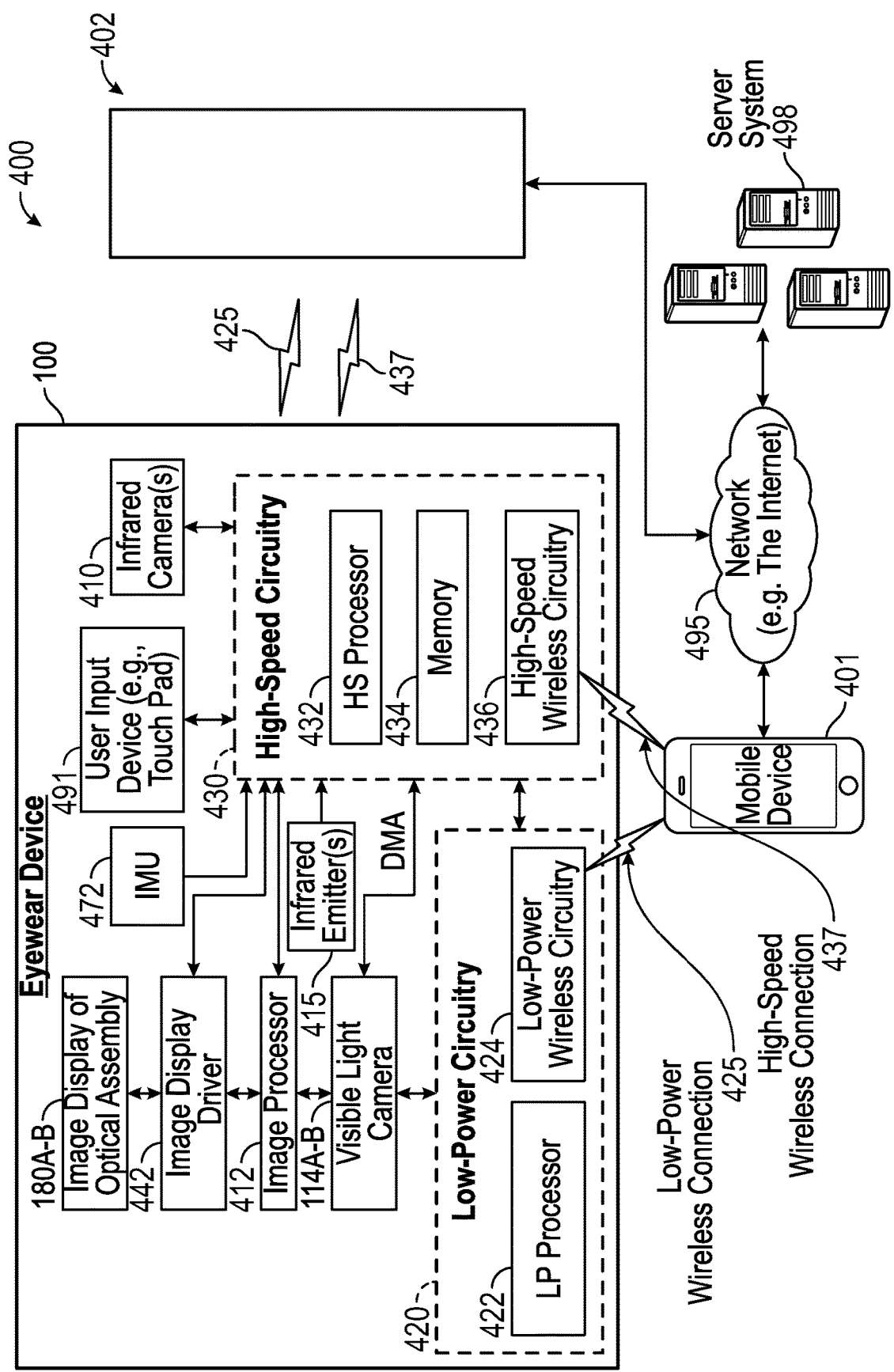
FIG. 4A is a functional block diagram of an example augmented reality system including a wearable device (e.g., an eyewear device), another electronic device, and a server system connected via various networks.

FIG. 4A is a functional block diagram of an example augmented reality system 400 including a wearable device (e.g., an eyewear device 100), another electronic device 402, a mobile device 401, and a server system 498 connected via various networks 495 such as the Internet. The system 400 includes a low-power wireless connection 425 and a high-speed wireless connection 437 between the eyewear device 100 and a mobile device 401—and, in some examples, as shown, between the eyewear device 100 and the other electronic device 402.

In one example, the other electronic device 402 is a remote device that may be a "smart device" (also referred to as an IoT device) including a power supply 652 (separate from that of the eyewear device), a microcontroller 656 or processor, a high-speed network connection 654, a memory 658, and physical output devices 662 (such as, for example, illumination sources, airflow sources, etc.) (shown in FIG. 4C).

As shown in FIG. 4A, the eyewear device 100 includes one or more visible-light cameras 114A, 114B that capture still images or video, as described herein. The cameras 114A, 114B may have a direct memory access (DMA) to high-speed circuitry 430 and function as a stereo camera. The cameras 114A, 114B may be used to capture initial-depth images for rendering three-dimensional (3D) models that are texture-mapped images of a red, green, and blue (RGB) imaged scene. The device 100 may also include a depth sensor, which uses infrared signals to estimate the position of objects relative to the device 100. The depth sensor in some examples includes one or more infrared emitter(s) 415 and infrared camera(s) 410. The cameras and the depth sensor are non-limiting examples of sensors in the eyewear device 100.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images or video. The image display driver 442 is coupled to the image displays of each optical assembly 180A, 180B in order to control the display of images.

The components shown in FIG. 4A for the eyewear device 100 are located on one or more circuit boards, for example, a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4A, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or WiFi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Figure 5:
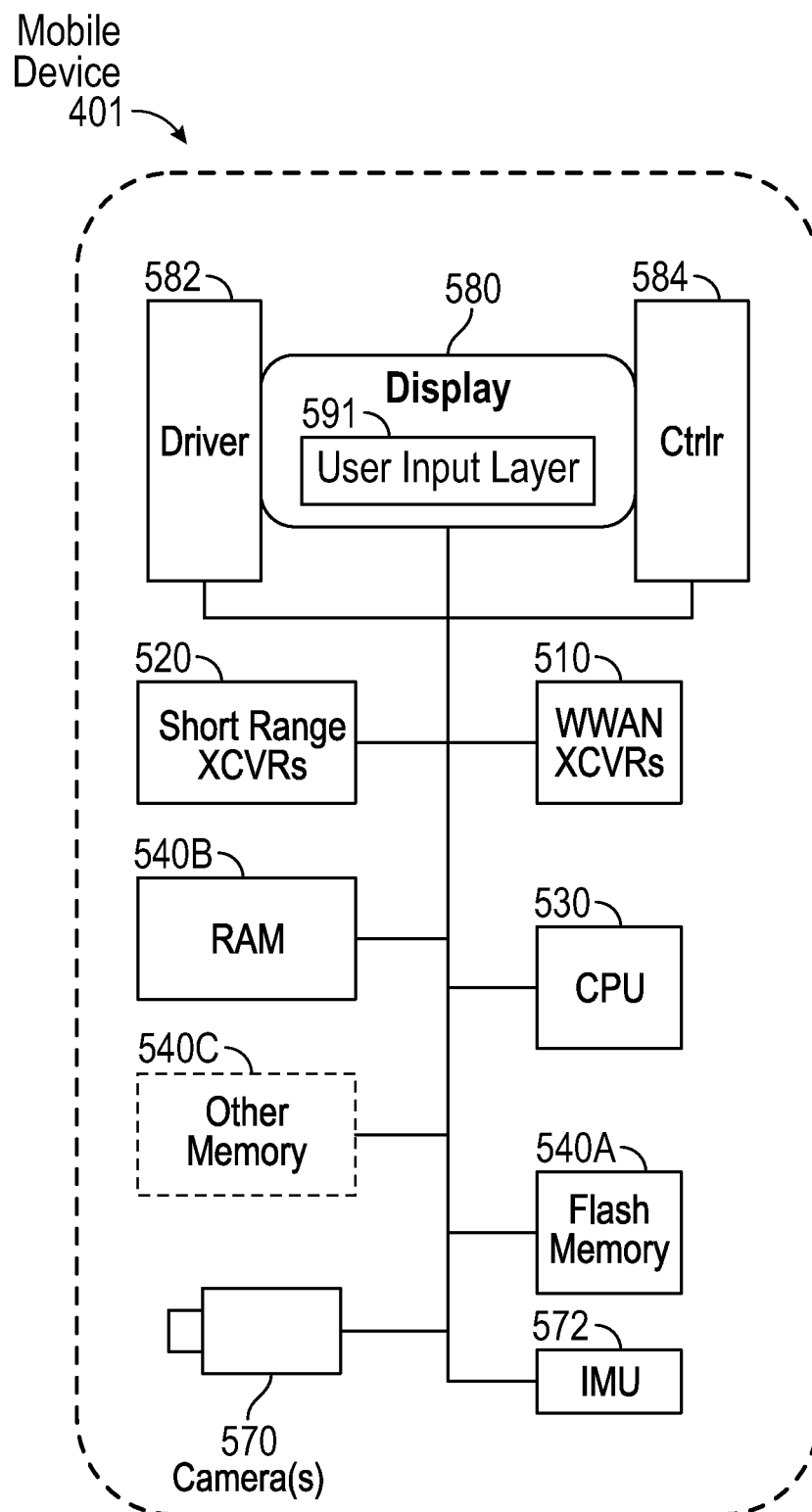
FIG. 5 is a diagrammatic representation of an example hardware configuration for a mobile device of the augmented reality system of FIG. 4A.

As shown in FIG. 4A, the high-speed processor 432 of the eyewear device 100 can be coupled to the camera system (visible-light cameras 114A, 114B), the image display driver 442, the user input device 491, and the memory 434. As shown in FIG. 5, the CPU 530 of the mobile device 401 may be coupled to a camera system 570, a mobile display driver 582, a user input layer 491, an IMU 572, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker, or a vibrating actuator), an outward-facing signal (e.g., an LED, a loudspeaker), or both. The image displays of each optical assembly 180A, 180B are driven by the image display driver 442. In some example configurations, the output components of the eyewear device 100 further include additional indicators such as audible elements (e.g., loudspeakers), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. Additionally, or alternatively, the position of the eyewear device 100 may be determined by comparing images captured by, for example, cameras 114 and comparing those images to previously captured images having known positional information. Thus, the position of the device 100 may be determined by location sensors, such as image information gathered by cameras 114, a GPS receiver, one or more transceivers to generate relative position coordinates, altitude sensors, barometers, or other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure biosignals (e.g., blood pressure, heart rate, body temperature, perspiration, or brain waves), or to identify a person (e.g., identification based on voice, retina, facial characteristics, fingerprints, or electrical biosignals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

In some examples, the devices 100, 401, 402 illustrated in FIG. 4A are configured to cooperate and share the processing demand when performing any of the functions described herein. For example, the other electronic device 402, may be configured to detect an interaction, such as a wireless signal from the device 100, and process the interaction to determine relative proximity. If within a predefined range, the electronic device 402 sends an application programming interface (API) to the eyewear device 100, at which point the eyewear device 100 takes over the task of performing additional functions. Additional functions may also be performed by the mobile device 401. In this aspect, the augmented reality system 400 distributes, shares, and manages the processing demand such that the functions described herein are performed efficiently and effectively.

The augmented reality system 400, as shown in FIG. 4A, includes a computing device, such as mobile device 401, coupled to an eyewear device 100 and another remote electronic device 402 over a network. The augmented reality system 400 includes a memory for storing instructions and a processor for executing the instructions. Execution of the instructions of the augmented reality system 400 by the processor 432 configures the eyewear device 100 to cooperate with the other electronic device 402 or the mobile device 401. The system 400 may utilize the memory 434 of the eyewear device 100 or the memory elements 540A, 540B, 540C of the mobile device 401 (FIG. 5) or the memory 540 of the other electronic device 402 (FIG. 4A). Also, the system 400 may utilize the processor elements 432, 422 of the eyewear device 100 or the central processing unit (CPU) 540 of the mobile device 401 (FIG. 5) or the microprocessor 656 of the other electronic device 402. In addition, the system 400 may further utilize the memory and processor elements of the server system 498. In this aspect, the memory and processing functions of the augmented reality system 400 can be shared or distributed across the eyewear device 100, the mobile device 401, the other electronic device 402, or the server system 498.

Figure 4B:
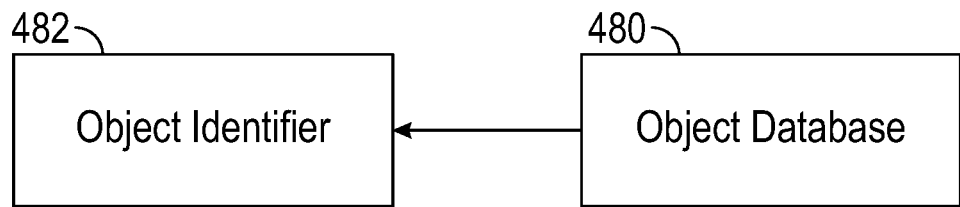
FIG. 4B is a flow diagram of an aspect of an augmented reality system.
Figure 4C:
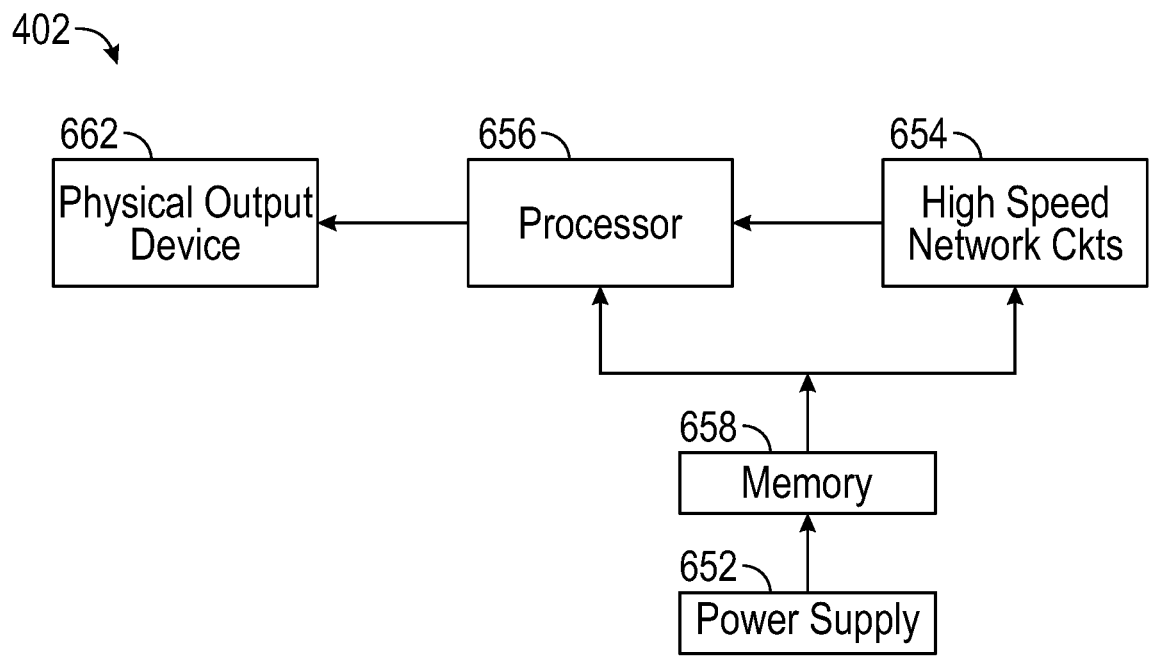
FIG. 4C is a functional block diagram of a "smart component" for use in one example of the augmented reality system.

In some examples, a portion of the memory 434 is used to store an object database 480 (see FIG. 4B) while another portion of the memory 434 has programming stored therein, which when executed by the processor 432 provides an object identifier 482 (see FIG. 4B). The flowchart shown in FIG. 4B illustrates such an example.

In some examples, the object database 480 is initially stored in a memory of the server system 498 and the memory 434 has programming stored in, which when executed by the processor 432 causes the eyewear device to access the server system 498, retrieve all or a portion of the object database 480 from the server system 498 and store the retrieved object database 480 in the memory 434.

FIG. 5 is a high-level functional block diagram of an example mobile device 401. Mobile device 401 includes a flash memory 540A that stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. The structure and operation of the touchscreen-type devices are provided by way of example and the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus or other tool) and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or WiFi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include image-based location systems and a global positioning system (GPS) receiver. Alternatively, or additionally, the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Suitable algorithms including particle filter, extended Kalman filter, and covariance intersection methods. Algorithms that apply machine learning in SLAM are also within the scope of these teachings.

Sensor data includes images received from one or both of the cameras 114A-B, distance received from a laser range finder, position information received from a GPS unit, or a combination of two or more of such sensor or other sensor providing data useful in determining positional information.

Figure 6:
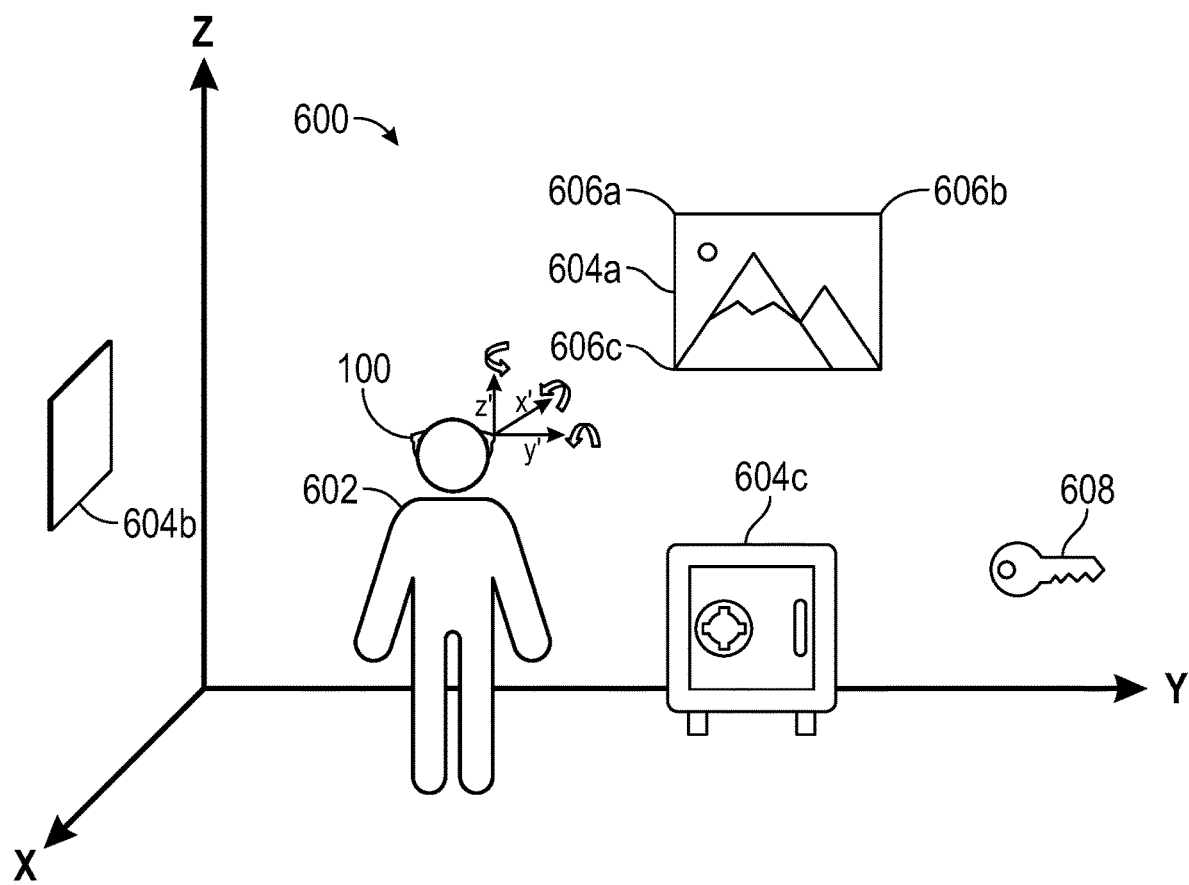
FIG. 6 is an illustration for use is describing simultaneous localization and mapping.

FIG. 6 depicts an example environment 600 for implementing natural feature tracking (NFT; e.g., SLAM processing). A user 602 of the eyewear device 100 is present in the environment 600 (which is a room in FIG. 6). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (position, roll, pitch, and yaw) of the eyewear device 100 within the environment by using two or more location points (e.g., three location points 606*a*, 606*b*, and 606*c*) on one or more objects 604 or by using one or more location points 606 on two or more objects 604. The processor 432 of the eyewear device 100 may position virtual objects such as key 608 within the environment for augmented reality viewing via image displays 180.

Figure 7A:
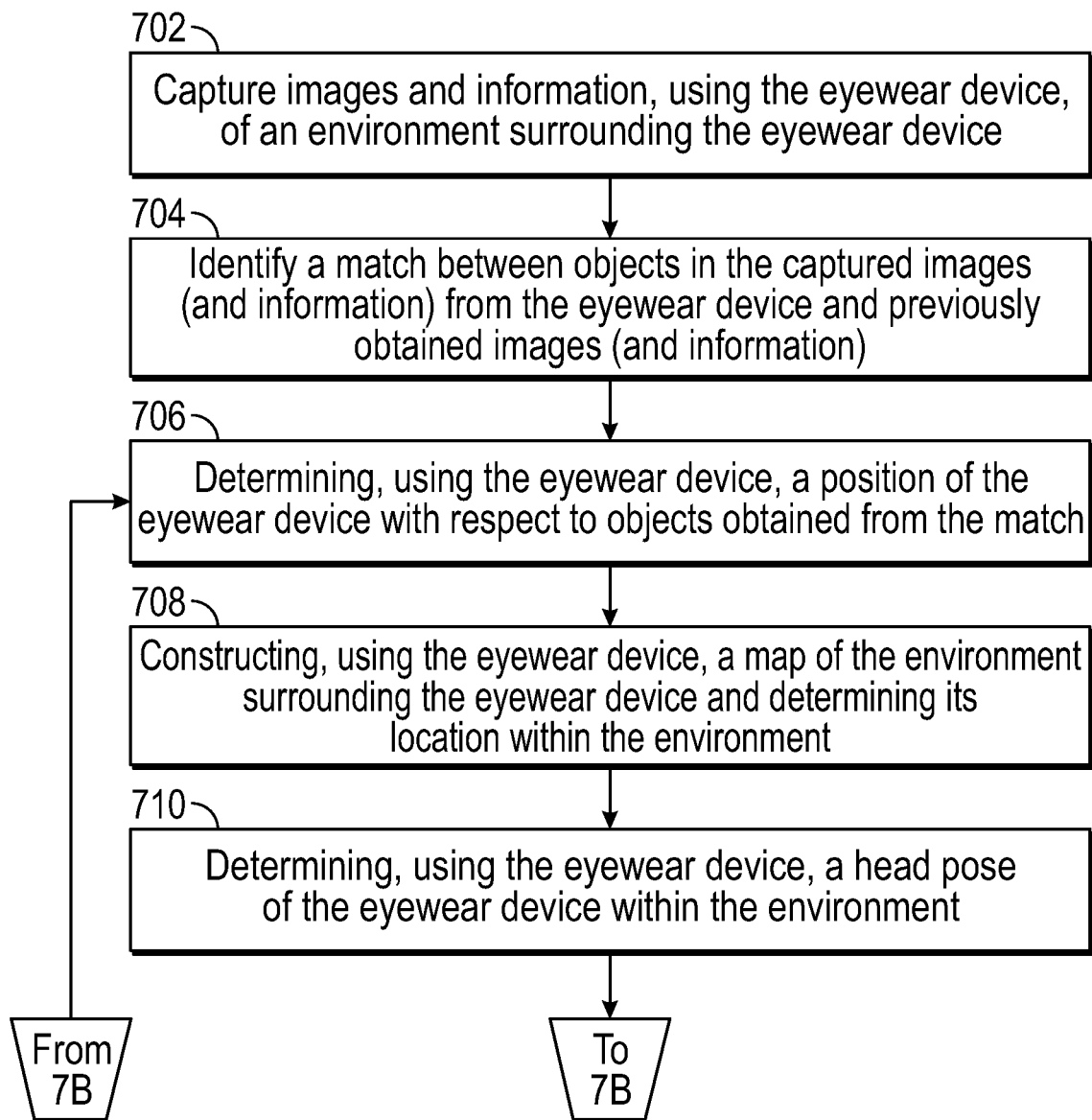
FIGS. 7A and 7B are flowcharts of an example method for providing a physical output that varies as the position of the eyewear device changes.
Figure 7B:
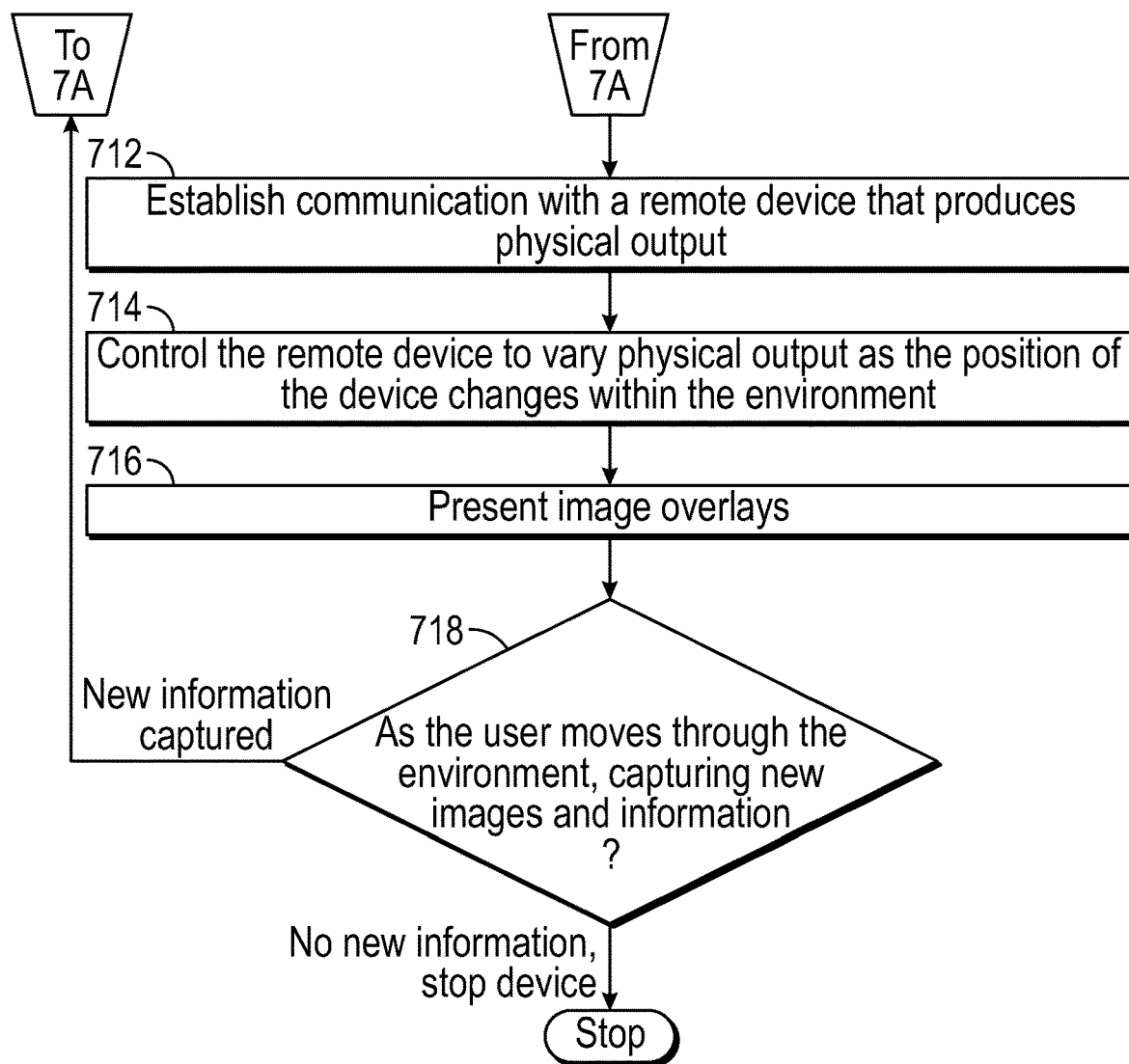

FIGS. 7A and 7B show a flow chart depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIGS. 7A and 7B and described herein may be omitted, performed simultaneously or in a series, performed in an order other than illustrated and described, or performed in conjunction with additional steps.

At block 702, the eyewear device 100 captures images of the environment 600 surrounding the eyewear device 100. The processor 432 may continuously receive images from the visible light camera(s) 114 and store those images in memory 434 for processing. Additionally, the eyewear device may capture information from other sensors, e.g., location information from a GPS sensor or distance information from a laser distance sensor).

At block 704, the eyewear device 100 compares objects in the captured images to objects in known images (previously captured images) to identify a match. The processor 432 may compare object image data from the captured images stored in memory 434 to object image data of known objects in the object database 480 (FIG. 4B) to identify a match using the object identifier 482 (FIG. 4B), e.g., implementing a conventional object recognition algorithm or a neural network trained to identify objects. In one example, the processor 432 is programmed to identify a predefined particular object (e.g., a particular picture 604*a* hanging in a known location on a wall, a window 604*b* in another wall, and a heavy object such as a safe 604*c* positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images that are greater than the points of the identified objects indicate the eyewear device 100 is closer to the identified object than the imager that captured the image including the identified object. On the other hand, distances between the points of the captured images that are less than the points of the identified objects indicate the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects, e.g., through SLAM processing. In another example, the eyewear device constructs a map using images of permanent or semi-permanent objects 604 within an environment (e.g., a tree or a park bench within a park). In accordance with this example, the eyewear device 100 may define the coordinate system (x', y', z') used for the environment.

At block 710, the eyewear device 100 determines a head pose (location, roll, pitch, and yaw) of the eyewear device 100 within the environment. The processor 432 may determine head pose by using two or more location points (e.g., three location points 606*a*, 606*b*, and 606*c*) on one or more objects 604 or by using one or more location points 606 on two or more objects 604. Using conventional image processing algorithms, the processor 432 determines roll, pitch, and yaw by comparing the angle and length of lines extending between the location points for the for the captured images and the known images.

At block 712, establish communication with a remote device when the position of the eyewear device 100 reaches a predetermined location within the environment. The remote device is configured to produce a physical output. The processor 432 of the eyewear device 100 may establish communication with the remote device 402 via a transceiver (e.g., wireless circuitry 424/436). In one example, upon establishing communication, remote device 402 transfers an API to the eyewear device 100 for use in controlling the physical output of the remote device 402. In other examples, the eyewear device 100 includes programming previously stored in memory 434 for providing signals for controlling the remote device 402 or the eyewear device 100 may retrieve such programming from the mobile device 401 or server system 498 directly or via a network 495.

The physical output, by way of non-limiting example, refers to electromagnetic radiation (photons), sound, air flow or mass flow (particles, confetti, etc.). The predetermined location maybe selected during a setup procedure. The predetermined location can be selected by selecting particular image characteristics to be found (see block 704). The predetermined location can also be selected by identifying a marker, where the identification can be placed, during the setup in a video (or audio) file, for example, in metadata.

At block 714, control the remote device to vary the physical output as the position (location, orientation, or both) of the eyewear device changes within the environment. The eyewear device 100 controls the remote device 402 (e.g., via a retrieved API) to vary the physical output responsive to movement of the eyewear device 100 within the environment. The eyewear device 100 may control the remote device 402 responsive to its location (e.g., using techniques described above for block 708), its orientation (e.g., using techniques described above for block 710), or both location and orientation.

In one example, the physical output is controlled responsive to both location and orientation. In accordance with this example, if the physical output is an image of a sun 910 projected on a screen (see FIG. 9B). Changing the location of the eyewear device 100, e.g., moving forward/backward, will change the diameter of the sub projected on the screen, e.g., increasing/decreasing, while changing the orientation of the eyewear device 100, e.g., changing the yaw/pitch, will change the location of the sun on the screen, e.g., horizontal/vertical location. Also in accordance with this example, if the physical output is a directional fan. Changing the location of the eyewear device 100, e.g., moving forward/backward, will change the intensity of air flow, while changing the orientation of the eyewear device 100, e.g., changing the yaw/pitch, will change the direction of the air flow.

In another example, the physical output is controlled responsive to the orientation of the eyewear device 100 for as long as the location of the eyewear device 100 remains within a predefined area of the environment, e.g., within a predefined radius of the predetermined location within the environment resulting in establishing communication (see block 712). In accordance with this example, while the eyewear device 100 remains within the predefined area, the orientation/head pose of the eyewear device controls the physical output. When the eyewear device 100 exits the predefined area, the eyewear device 100 no longer controls the physical output.

At block 716, optionally, present image overlays on the eyewear device 100 to a user/wearer. The eyewear device 100 may add an augmented reality feature associated with the physical output, e.g., rays 924 emanating from a sun projected by a remote device 402 on a background, using optical assembly 180 under control of image display driver 442 and image processor 412.

At block 718, the steps described above with reference to blocks 706-716 are repeated to update the position of the eyewear device 100 as the user moves through the environment 600.

Figure 8:
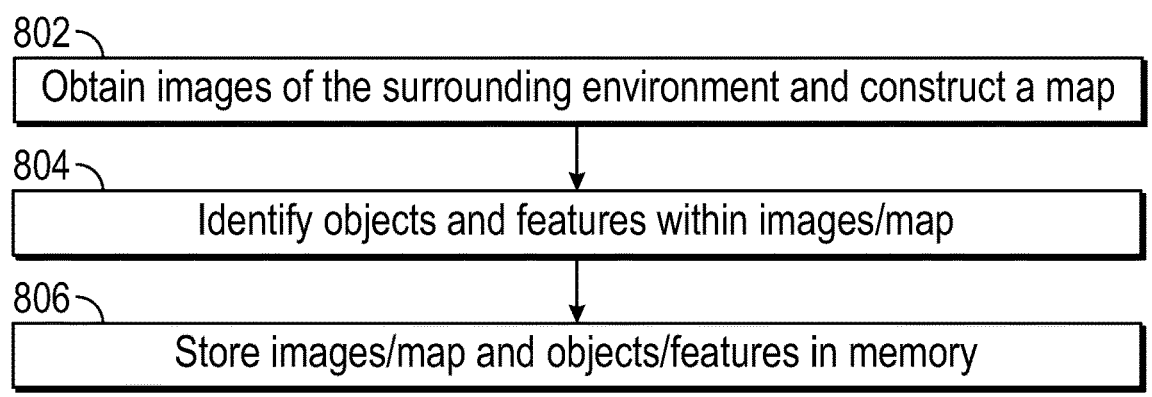
FIG. 8 is a flowchart of an example set up method for the eyewear device in an environment.

FIG. 8 depicts a flow diagram of an example process for setting up the eyewear device 100 for use in a given environment. To set up the eyewear device 100, the eyewear device 100 or other device with similarly positioned cameras, at block 802, captures images of the surrounding environment in which the eyewear device is going to be used along with location coordinates, and a map of the surrounding environment is constructed. From the images and the map, at block 804, objects and features are identified. This identification can be performed by tagging areas of the image at identified pixel locations. Alternately, a feature can be associated with a marker, e.g., stored in a metadata header, described by proximity relationship to other features. The images/map of the surrounding environment and the identified object and features are stored in a digital memory at block 806.

Figure 9A:
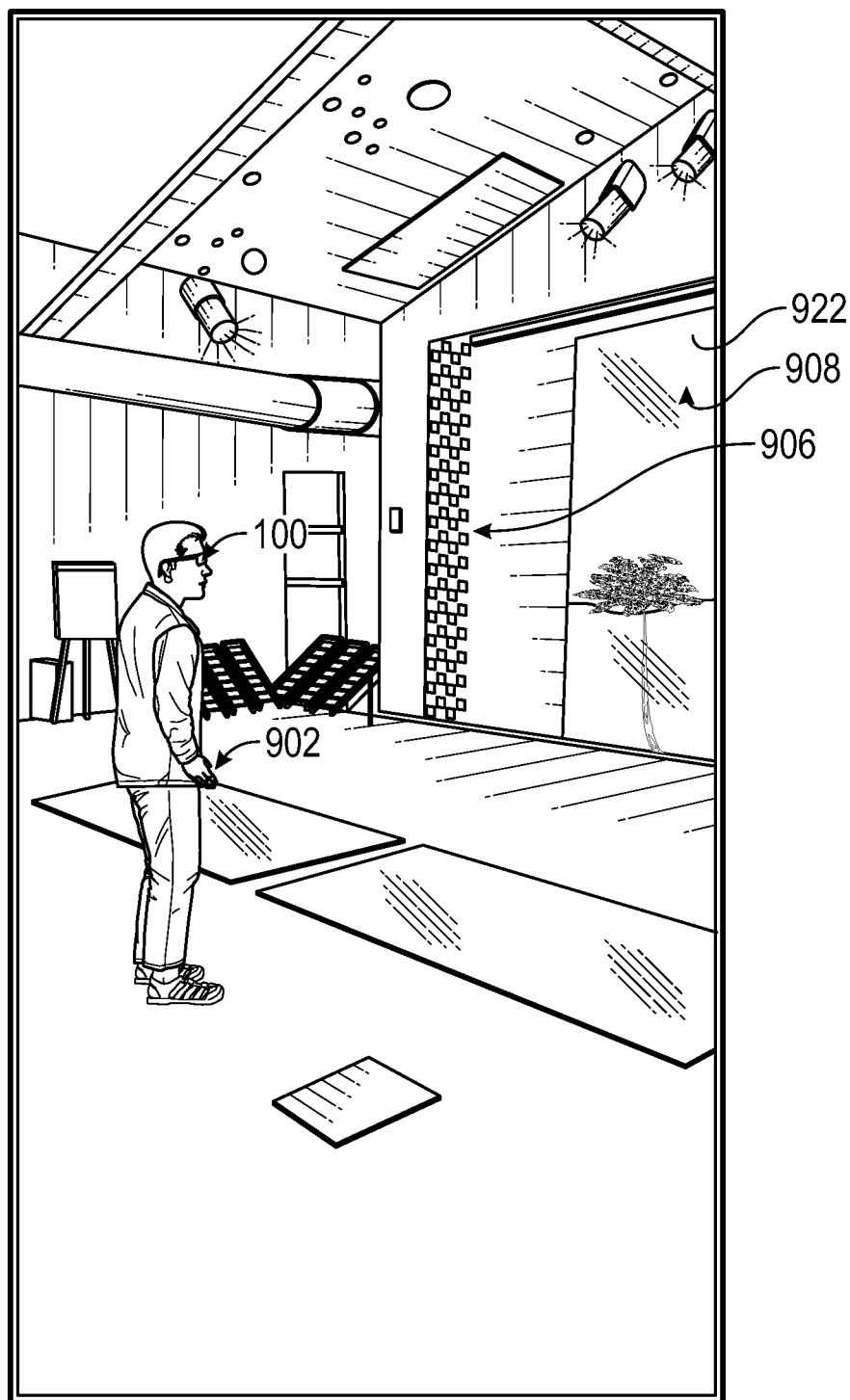
FIGS. 9A, 9B, and 9C are illustrations depicting an example use of the eyewear device.
Figure 9B:
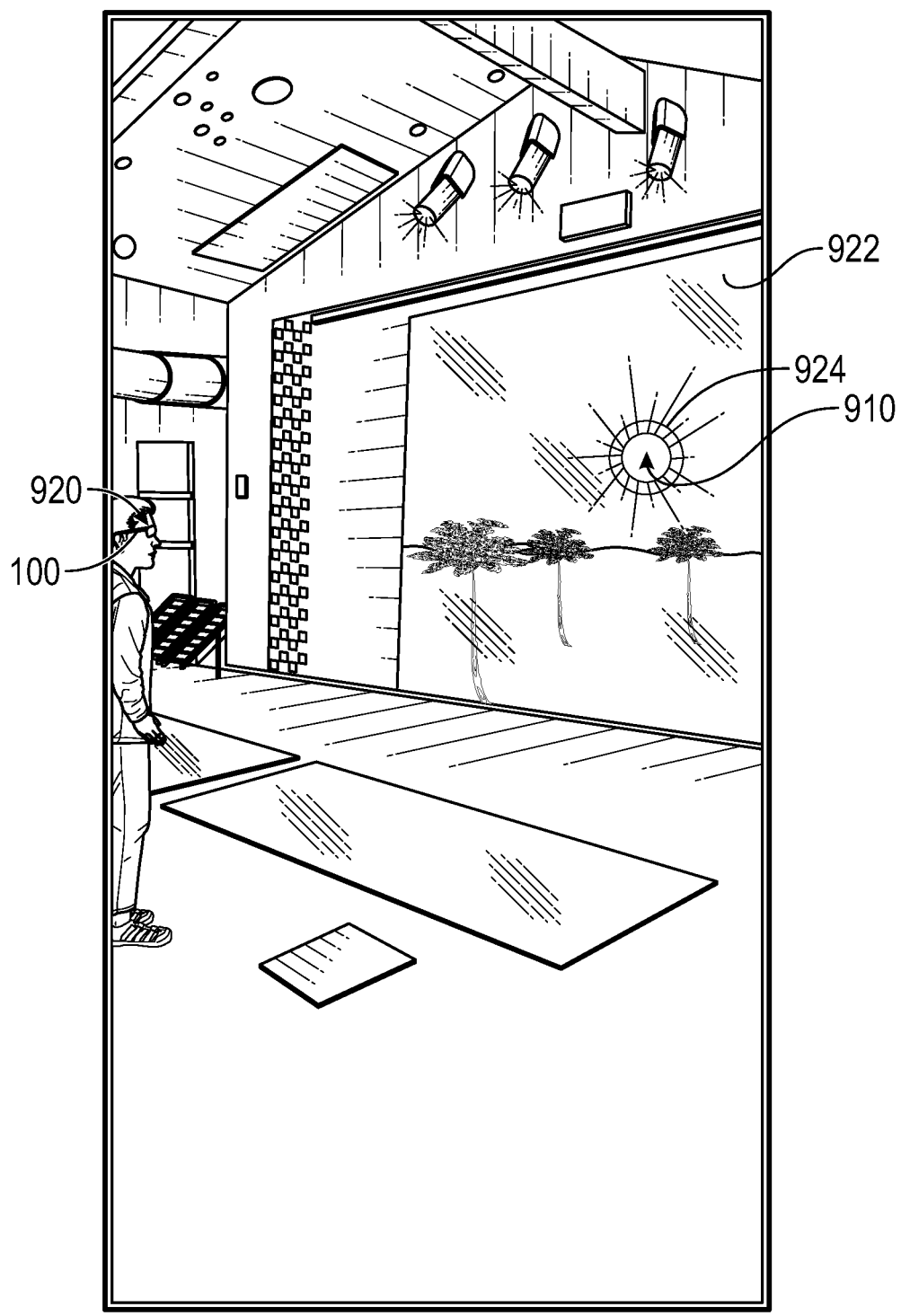
Figure 9C:
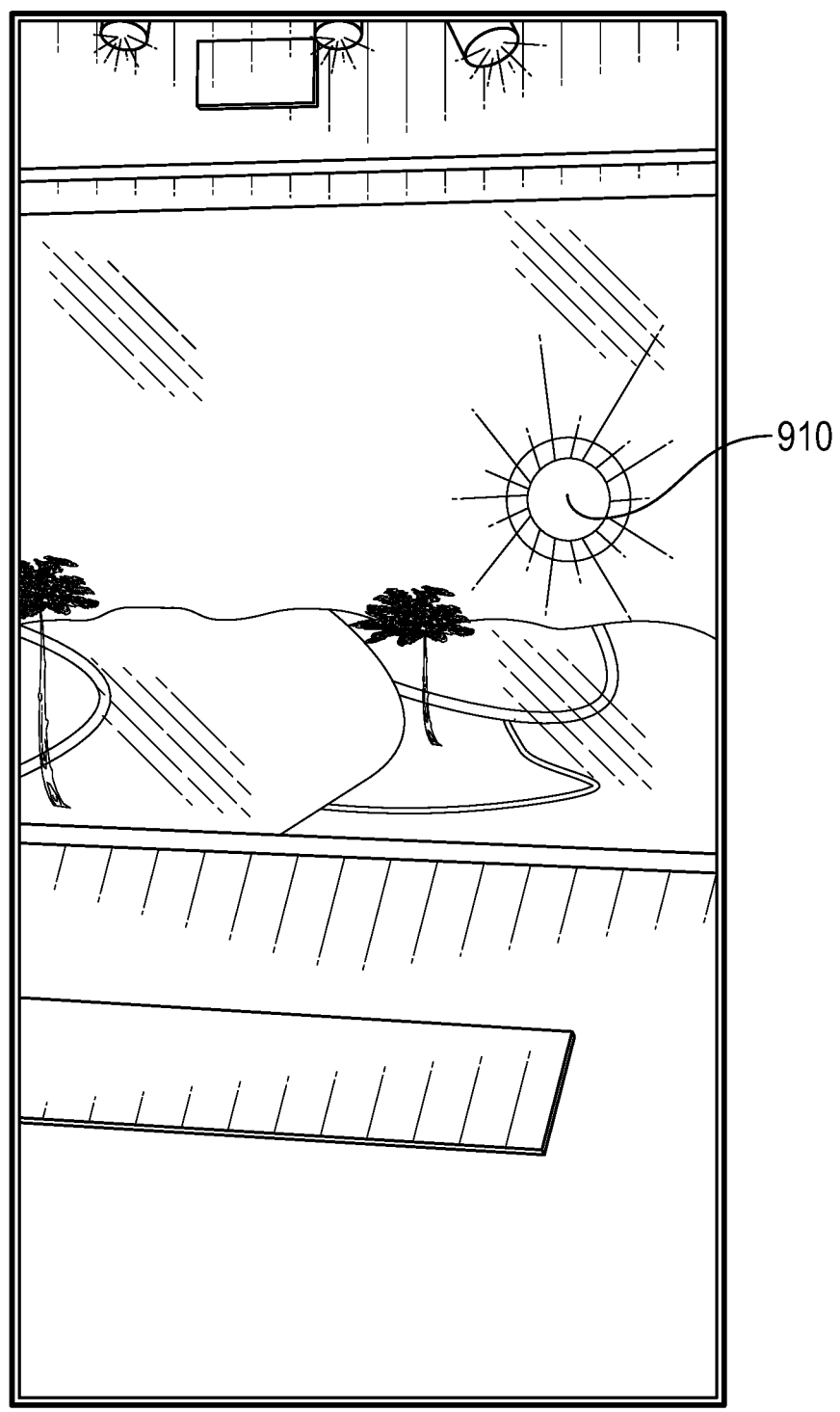

FIGS. 9A, 9B, and 9C are images for use in describing one example. In the example shown in FIGS. 9A, 9B, and 9C, a user 902 wearing an eyewear device 100 enters an environment (e.g., a room of a warehouse in the illustrated example). The eyewear device 100 captures images within the environment. The eyewear device 100 identifies objects/features within the images such as a frame 906 and a screen 908. Using SLAM processing, the eyewear device 100 determines it's position (location/orientation) within the environment with respect to the object/features. When the eyewear device 100 reaches a predetermined location within the environment (e.g., X, Y, Z location coordinate 920), the eyewear device 100 establishes communication with a remote device, e.g., a projector (not shown) projecting an image 922 on the screen 908. The eyewear device 100 then controls a physical output of the projector based on its position. For example, changing the orientation/head pose of the eyewear device 100 results in a sun 910 changing location on the screen 908 from a first location (FIG. 9B) to a second location (FIG. 9C).

Additionally, the eyewear device 100 may add an augmented reality feature associated with the physical output, e.g., rays 924 emanating from the sun 910, using optical assembly 180 under control of image display driver 442 and image processor 412.

In another example, a user wearing an eyewear device 100 captures images and information depicting another environment surrounding the eyewear device 100. When the eyewear device 100 reaches a predetermined location within the environment with respect to a book on a stand (e.g., an associated X, Y, Z location coordinate), the eyewear device 100 establishes communication with another remote device, e.g., an air flow source (not shown). The eyewear device 100 then controls a physical output of the air flow source based on its position. For example, changing the orientation/head pose of the eyewear device 100 results in a puff of air from the air flow source that is directed toward the book to turn a page in the book.

Any of the functionality described herein for the eyewear device 100, the mobile device 401, the remote device 402, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to produce one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising:
   a device configured to be head mounted on a user, the device comprising;
      a processor, a memory, a transceiver, and at least one image sensor;
   programming in said memory, wherein execution of said programming by said processor configures the processor to:
      capture, with the at least one image sensor, image information of an environment surrounding the device;
      determine a position of the device based on the image information;
      establish, via the transceiver, communication with a remote device in response to the position of the device reaching a predetermined location within the environment, the remote device configured to produce a physical output; and
      control the remote device to vary the physical output as the position of the device changes within the environment.

2. The system of claim 1, wherein to determine the position of the device the programming configures the processor to:
   determine a location of the device within the environment; and
   determine an orientation of the device at the determined location.

3. The system of claim 2, wherein the device establishes communication with the remote device responsive to the determined location matching the predetermined location and wherein the device controls the remote device responsive to the location and the orientation.

4. The system of claim 1, wherein the programming further configures the processor to:
  identify a match between at least one object in the image information and at least one stored object in previously obtained information;
  wherein the previously obtained information includes position information for location points associated with the objects, the at least one matched object includes a first matched object; and
  wherein to determine the position of the device the programming configures the processor to:
    identify at least two location points associated with the first matched object;
    determine relative position between the at least two location points associated with the first matched object in the image information and corresponding location points for the first matched object in the previously obtaining information; and
    calculate the position of the device from the determined relative position and the position information for the corresponding location points.

5. The system of claim 1, wherein execution of said programming includes providing, when the position of the device reaches the predetermined location within the environment, a signal to said remote device; and wherein, upon receipt of said signal, the physical output is produced.

6. The system of claim 1, wherein the programming further configures the processor to:
  identify a match between at least one object in the image information and at least one stored object in previously obtained information;
  wherein identifying the match between objects in the information depicting the environment surrounding the device and objects in previously obtained information comprises identifying a first match between a feature in the information depicting the environment surrounding the device and a predetermined feature in the previously obtained information.

7. The system of claim 6, wherein the predetermined feature has been tagged with a geolocation marker.

8. The system of claim 1, wherein the programming further configures the processor to:
  identify a match between at least one object in the image information and at least one stored object in previously obtained information;
  wherein said previously obtained information is stored in said memory.

9. The system of claim 1, wherein the programming further configures the processor to:
  identify a match between at least one object in the image information and at least one stored object in previously obtained information wherein said device also comprises a wireless communication component;
  wherein said system is operatively connected to a server system through a network;
wherein said previously obtained information is stored in another memory in said server system; and wherein programming in said memory, when executed by said processor configures the device to access said server system; retrieve said previously obtained information from said server system, and store said previously obtained information in said memory.

10. The system of claim 1, wherein the programming further configures the processor to:
  identify a match between at least one object in the image information and at least one stored object in previously obtained information;
  wherein to establish communication when the position of the device reaches the predetermined location the programming configures the processor to:
    determine, using said device, a position of said device with respect to objects obtained from the match;
    construct, using said device, a map of the environment surrounding said device and determine said device's location within the environment; and
    determine, using said device, a head pose of said device within the environment.

11. The system of claim 1, the device further comprising a global positioning sensor (GPS) and wherein execution of said programming further configures the processor to:
  identify a match between at least one object in the image information and at least one stored object in previously obtained information
  receive GPS location information;
  request the previously obtained information from a server system using the GPS location information, wherein the previously obtained information corresponds to the GPS location information; and
  receive the requested previously obtained information corresponding to the GPS location information.

12. A method for use with a device configured to be head mounted on a user, the device comprising a processor, a memory, a transceiver, and at least one image sensor, the method comprising:
  capturing, with the at least one image sensor, image information of an environment surrounding the device;
  determining a position of the device within the environment based on the image information;
  establishing, via the transceiver, communication with a remote device in response to the position of the device reaching a predetermined location within the environment, the remote device configured to produce a physical output; and
  controlling the remote device to vary the physical output as the position of the device changes within the environment.

13. The method of claim 12, wherein the determining the position of the device comprises:
  determining a location of the device within the environment; and
  determining an orientation of the device at the determined location.

14. The method of claim 12, further comprising:
  identifying a match between at least one object in the image information and at least one stored object in previously obtained information;
  wherein the previously obtained information includes position information for location points associated with the objects, the at least one matched object includes a first matched object, and wherein the determining the position of the device includes:
    identifying at least two location points associated with the first matched object;
    determining relative position between the at least two location points associated with the first matched object in the image information and corresponding location points for the first matched object in the previously obtaining information; and
    calculating the position of the device from the determined relative position and the position information for the corresponding location points.

15. The method of claim 12, further comprising providing, when the position of the device reaches the predetermined location within the environment, a signal to said remote device; and wherein, upon receipt of said signal, the physical output is produced.

16. The method of claim 12, further comprising;

identifying a match between at least one object in the image information and at least one stored object in previously obtained information;

wherein the identifying a match between objects in the information depicting the environment surrounding the device and objects in previously obtained information comprises identifying a first match between a feature in the information depicting the environment surrounding the device and a predetermined feature in the previously obtained information.

17. The method of claim 12, further comprising:

identifying a match between at least one object in the image information and at least one stored object in previously obtained information;

wherein the establishing communication when the position of the device reaches the predetermined location includes:

determining, using said device, a position of said device with respect to objects obtained from the match;

constructing, using said device, a map of the environment surrounding said device and determining said device's location within the environment; and determining, using said device, a head pose of said device within the environment.

18. The method of claim 12, the device further comprising a global positioning sensor (GPS) and wherein the method further comprises:

identifying a match between at least one object in the image information and at least one stored object in previously obtained information receiving GPS location information;

requesting the previously obtained information from a server system using the GPS location information, wherein the previously obtained information corresponds to the GPS location information; and receiving the requested previously obtained information corresponding to the GPS location information.

19. A non-transitory computer-readable medium storing program code for use with a device configured to be head mounted on a user, the device comprising a processor, a memory, a transceiver, and at least one image sensor, the program code, when executed, is operative to cause a processor to:

capture, with the at least one image sensor, image information of an environment surrounding the device;

determine a position of the device within the environment based on the image information;

establish, via the transceiver, communication with a remote device in response to the position of the device reaching a predetermined location within the environment, the remote device configured to produce a physical output; and control the remote device to vary the physical output as the position of the device changes within the environment.

20. The non-transitory computer-readable medium of claim 19, wherein to determine the position of the device the program code, when executed, is operative to further cause the processor to:

determine a location of the device within the environment; and determine an orientation of the device at the determined location.

* * * * *